(12) United States Patent
Tsuchida et al.

(10) Patent No.: US 6,778,259 B2
(45) Date of Patent: Aug. 17, 2004

(54) PHOTO FILM ADVANCING DEVICE HAVING A GUIDE HOLDER AND A PHOTO FILM CARRIER

(75) Inventors: Chukei Tsuchida, Kanagawa (JP); Shigeru Tanaka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 14 days.

(21) Appl. No.: 10/096,884

(22) Filed: Mar. 14, 2002

(65) Prior Publication Data

US 2002/0131031 A1 Sep. 19, 2002

(30) Foreign Application Priority Data

Mar. 14, 2001 (JP) ........................................ 2001-073018

(51) Int. Cl.[7] .................. G03B 27/58; G03B 27/44; G03B 27/62; G03B 27/50
(52) U.S. Cl. ............................ 355/72; 355/46; 355/75; 355/50
(58) Field of Search ............................. 355/72, 75, 40, 355/18, 50, 41, 76; 396/515, 284, 310; 242/554.5

(56) References Cited

U.S. PATENT DOCUMENTS 5,614,986 A * 3/1997 Yoshikawa et al. ........... 355/18
5,898,481 A * 4/1999 Oku ............................. 355/75
6,040,891 A   3/2000 Makino et al.

FOREIGN PATENT DOCUMENTS

JP          8-122943           5/1996

* cited by examiner

Primary Examiner—Peter B. Kim
(74) Attorney, Agent, or Firm—Sughrue Mion, PLLC

(57) ABSTRACT

A photo film cassette contains IX240 type of photo film in a manner movable out through a photo film passageway. A photo film carrier has a feeding path with an entrance, toward which the photo film is advanced. The photo film carrier includes a carrier base plate disposed to extend upstream from the entrance. A holder plate is secured to the carrier base plate in a shiftable manner between first and second positions, and has a first face and a second face. The first face is loaded with the photo film cassette, and when the holder plate is in the first position, is positioned close to the entrance, for opposing the photo film passageway of the photo film cassette to the entrance. The second face, when the holder plate is in the second position, is positioned close to the entrance, for guiding entry of photo film of IX240 type in a cassetteless form to the entrance.

27 Claims, 13 Drawing Sheets

PHOTO FILM ADVANCING DEVICE HAVING A GUIDE HOLDER AND A PHOTO FILM CARRIER

BACKGROUND OF THE INVENTION

1. Field of the Invention

The present invention relates to a photo film advancing device and a photo film carrier. More particularly, the present invention relates to a photo film advancing device and a photo film carrier of which adapted for use with photo films of different types, and having a simplified structure.

2. Description Related to the Prior Art

There are plural types of photo films, including 135 type and IX240 type. The IX240 type has a different value of a photo film width from that of 135 type. Another difference between those types lies in a state of containing the photo filmstrip after being developed. The photo film of 135 type is removed from a cassette shell, treated as a strip, and cut into plural pieces each of which includes six image frames. In contrast, the photo film of IX240 type is preserved in a photo film cassette without being cut.

A photo film carrier is used with an image reading device or photographic printer, for positioning each image frame of the photo film at an image reading position or exposure position. U.S. Pat. No. 6,040,891 (corresponding to JP-A 10-339916) discloses a suggestion for efficiently reading image frames from the photo film of types different in the photo film width or a state of being contained. The photo film carrier according to the document has plural feeding paths, predetermined for respectively types of the photo film being developed.

To use the IX240 type of the photo film in the photo film carrier, a cassette loading unit is required in the photo film carrier. This is because the photo film cassette is used for preserving the photo film being developed, and the photo film carrier must be loaded with the photo film cassette. JP-A 8-122943 discloses an example of the cassette loading unit with which the photo film carrier is loaded with the photo film cassette.

According to the document, a holder is included in the cassette loading unit, for holding the photo film cassette at one end of the feeding path which guides transport of the photo film toward a printing position. The holder is movable perpendicularly to the feeding path. A loading position of the holder is predetermined away from the feeding path for loading of the photo film cassette. The photo film cassette, when the holder is in the loading position, is set in an orientation where the spool is directed perpendicular to the feeding path. After the loading, the holder is shifted to a photo film advancing position, which is predetermined inside the loading position and associated with the feeding path. When the holder is set in the photo film advancing position, a photo film passageway of the photo film cassette is opposed to the feeding path. After this, the drive mechanism is coupled with the spool, before the drive mechanism is actuated to rotate the spool in the unwinding direction. The photo film is transported into the feeding path.

In general, the IX240 type of the photo film is handled in a state associated with the photo film cassette for preservation. However, it happens that the photo film of the same time is removed from the photo film cassette and handled as a photo filmstrip. An inserter is required in the photo film carrier for inserting the photo filmstrip in the feeding path in addition to the cassette loading unit. In the photo film carrier according to the above document, the inserter is disposed above the photo film advancing position of the holder. The inserter has an inclined tunnel shape, is fastened to the photo film carrier, and operates as a guide. The inserter helps introduce the photo filmstrip into the feeding path in a downward direction in a position downstream from the photo film advancing position of the holder.

However, the photo film carrier of the prior art has the holder movable crosswise to the feeding path for the photo film. The holder must be provided with a moving path in the direction of the photo film width. The photo film carrier is likely to have a considerably large size. Furthermore, the photo film carrier of the type having the two feeding paths parallel with one another has a problem of a great carrier size in the direction of the photo film width. The photo film carrier should have a reduced size. However, no known technique can miniaturize the photo film carrier.

SUMMARY OF THE INVENTION

In view of the foregoing problems, an object of the present invention is to provide a photo film advancing device and a photo film carrier of which adapted for use with photo films of types different in a handling process after development, and having a simplified structure.

In order to achieve the above and other objects and advantages of this invention, a photo film advancing device for advancing a first type of photo film toward an entrance of a feeding path is provided. The photo film is contained in a photo film cassette in a manner movable out, the photo film cassette having a photo film passageway. The photo film advancing device includes a base member disposed to extend upstream from the entrance. A guide holder is secured to the base member in a shiftable manner between first and second positions, and has a holder portion and a guide portion. The holder portion is loaded with the photo film cassette, and when the guide holder is in the first position, is positioned close to the entrance, for opposing the photo film passageway of the photo film cassette to the entrance. The guide portion, when the guide holder is in the second position, is positioned close to the entrance, for guiding entry of photo film of the first type in a cassetteless form to the entrance.

The guide holder includes a shiftable holder plate, disposed to extend upstream from the entrance, having first and second faces, the first face constituting the holder portion, the second face being smooth and constituting the guide portion. A retention member retains the photo film cassette on the first face.

Furthermore, a first stopper prevents the holder plate from moving beyond the first position when the holder plate is in the first position with the photo film cassette retained by the retention member.

The retention member, when in a cassetteless state, is in a closed position shifted near to the holder plate, and is distant from the first stopper. Furthermore, a second stopper prevents the holder plate from moving beyond the second position when the holder plate is in the second position.

The retention member includes a retention arm, having a shape corresponding to the photo film cassette, and secured to the holder plate movably. Furthermore, a bias member biases the retention arm toward the holder plate to retain the photo film cassette on the holder plate.

The second position is located lower than the first position. The holder plate is further shiftable to a third position that is higher than the first position with respect to the base member, the third position is adapted for loading and unloading the photo film cassette to the retention member.

The photo film cassette includes a rotatable spool for winding the photo film thereabout. A rotatable cassette shutter shuts the photo film passageway openably. Furthermore, a spool drive mechanism is engaged with an axial end portion of the spool, to rotate the spool. A cassette shutter drive mechanism is engaged with an axial end portion of the cassette shutter, to rotate the cassette shutter. A control unit actuates the spool drive mechanism and the cassette shutter drive mechanism in response to setting the holder plate in the first position, to advance the photo film from the photo film cassette, or to return the photo film into the photo film cassette.

Furthermore, a third stopper prevents the holder plate from moving beyond the third position when the holder plate is in the third position.

Furthermore, a linking mechanism secures an upstream edge portion of the holder plate to the base member in a pivotally movable manner.

Furthermore, a projection portion is formed to project from the holder plate, for providing the holder plate with additional weight, to ensure shifting of the holder plate toward the first or second stopper under gravity.

According to a further preferred embodiment, a linking mechanism supports the holder plate to the base member in a slidable manner.

Furthermore, a bias mechanism biases the holder plate downwards, to ensure shifting of the holder plate toward the first or second stopper.

A second type of photo film is further usable. Furthermore, a second feeding path is disposed substantially in parallel with the feeding path, has a second entrance at an upstream end, for transporting the second type of the photo film inserted therein.

The first type is IX240 type, and the second type is 135 type.

Furthermore, a slider is operable externally for sliding. A support frame supports the spool drive mechanism. A transmission mechanism slides the support frame in response to sliding of the slider, to move the spool drive mechanism relative to the spool.

Furthermore, a transmission lever has a driven end portion and a driving end portion, the driving end portion driving the cassette shutter drive mechanism. A cam mechanism is connected between the slider and the driven end portion, for swinging the transmission lever in response to sliding of the slider, to actuate the cassette shutter drive mechanism.

Furthermore, a first rack slides with the slider. A transmission gear is rotated by sliding of the first rack. A second rack is secured to the support frame, for being slid by rotation of the transmission gear.

Furthermore, a motor rotates the spool drive mechanism. A planetary gear mechanism is secured between the motor and the spool drive mechanism, for disconnecting the spool drive mechanism from the motor when the spool drive mechanism rotates at a higher speed than a reference speed.

The planetary gear mechanism includes a sun gear for being rotated by the motor. First and second planet gears are meshed with the sun gear, for being rotated selectively. An auxiliary gear drives the spool drive mechanism, is rotated by the first planet gear when the sun gear rotates in a first direction, and is rotated by the second planet gear when the sun gear rotates in a second direction.

According to another aspect of the invention, a photo film carrier includes a first feeding path, having an entrance, for feeding a first type of photo film from a photo film cassette that has a photo film passageway, a first opening, formed in the first feeding path, and adapted for external access to the photo film for frame reading or frame printing, and a winding unit for winding the photo film from the first feeding path. The photo film carrier comprising a base member disposed to extend upstream from the entrance. A guide holder is secured to the base member in a shiftable manner between first and second positions, and having a holder portion and a guide portion. The holder portion is loaded with the photo film cassette, and when the guide holder is in the first position, is positioned close to the entrance, for opposing the photo film passageway of the photo film cassette to the entrance. The guide portion, when the guide holder is in the second position, is positioned close to the entrance, for guiding entry of photo film of the first type in a cassetteless form to the entrance.

A second type of photo film is further usable. Furthermore, a second feeding path is disposed substantially in parallel with the first feeding path, has a second entrance at an upstream end, for transporting the second type of the photo film inserted therein. A second opening is formed in the second feeding path, and adapted for external access to the second type of the photo film for frame reading or frame printing.

Furthermore, a carrier body is secured to a reading station of an image reading device or a printing station of a printer, and has the first and second feeding paths, the first and second openings, and the base member. A shifting mechanism shifts the carrier body relative to the image reading device or the printer, to set a selected one of the first and second openings at the reading or printing station.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

A photo film carrier of the invention is set in an image reading unit of an image reading device. There is a CCD in the image reading device for reading frame images of developed photo film, so as to process the information digitally.

Figure 1:
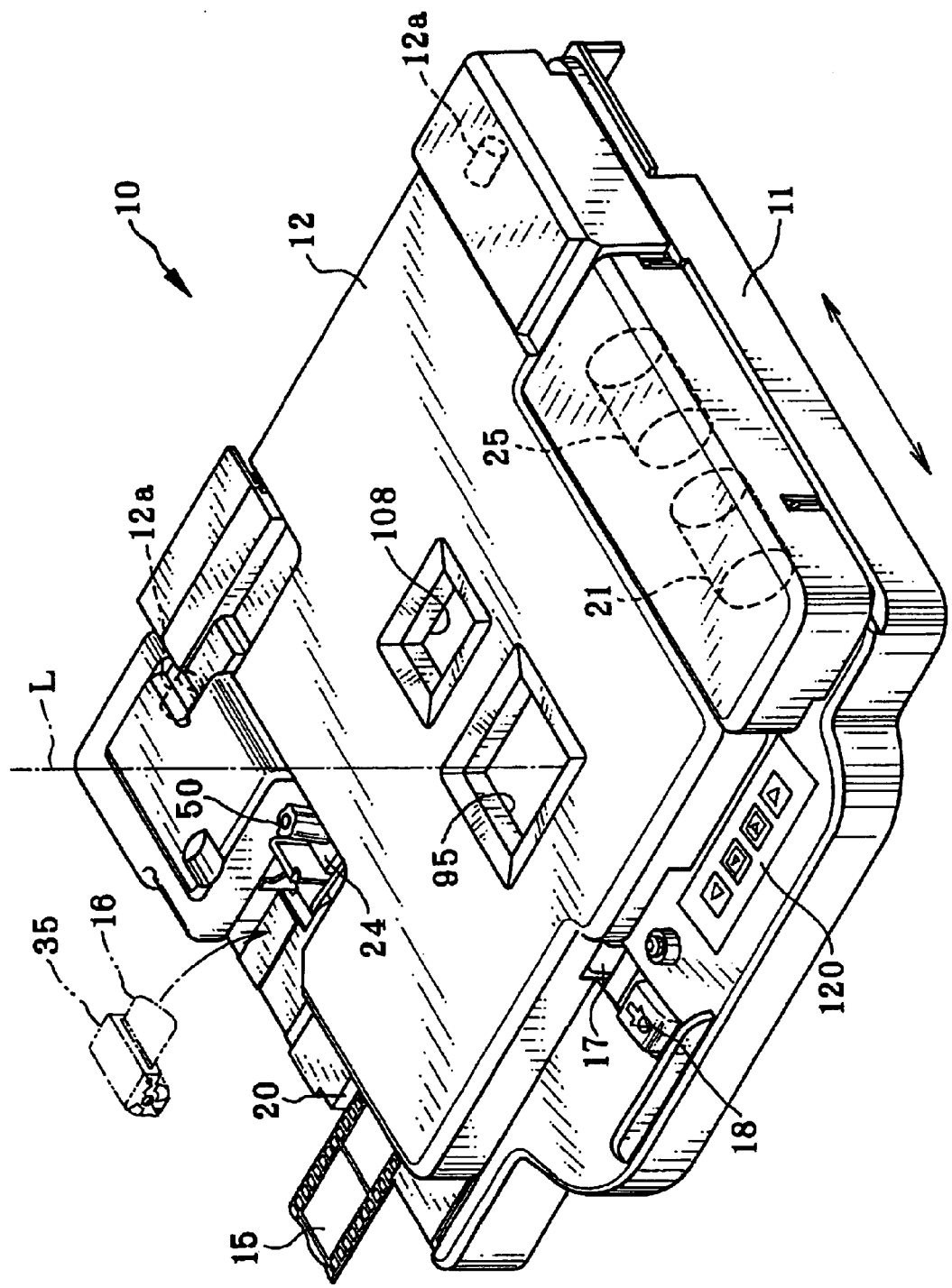
FIG. 1 is a perspective illustrating a photo film carrier of the invention.
Figure 2A:
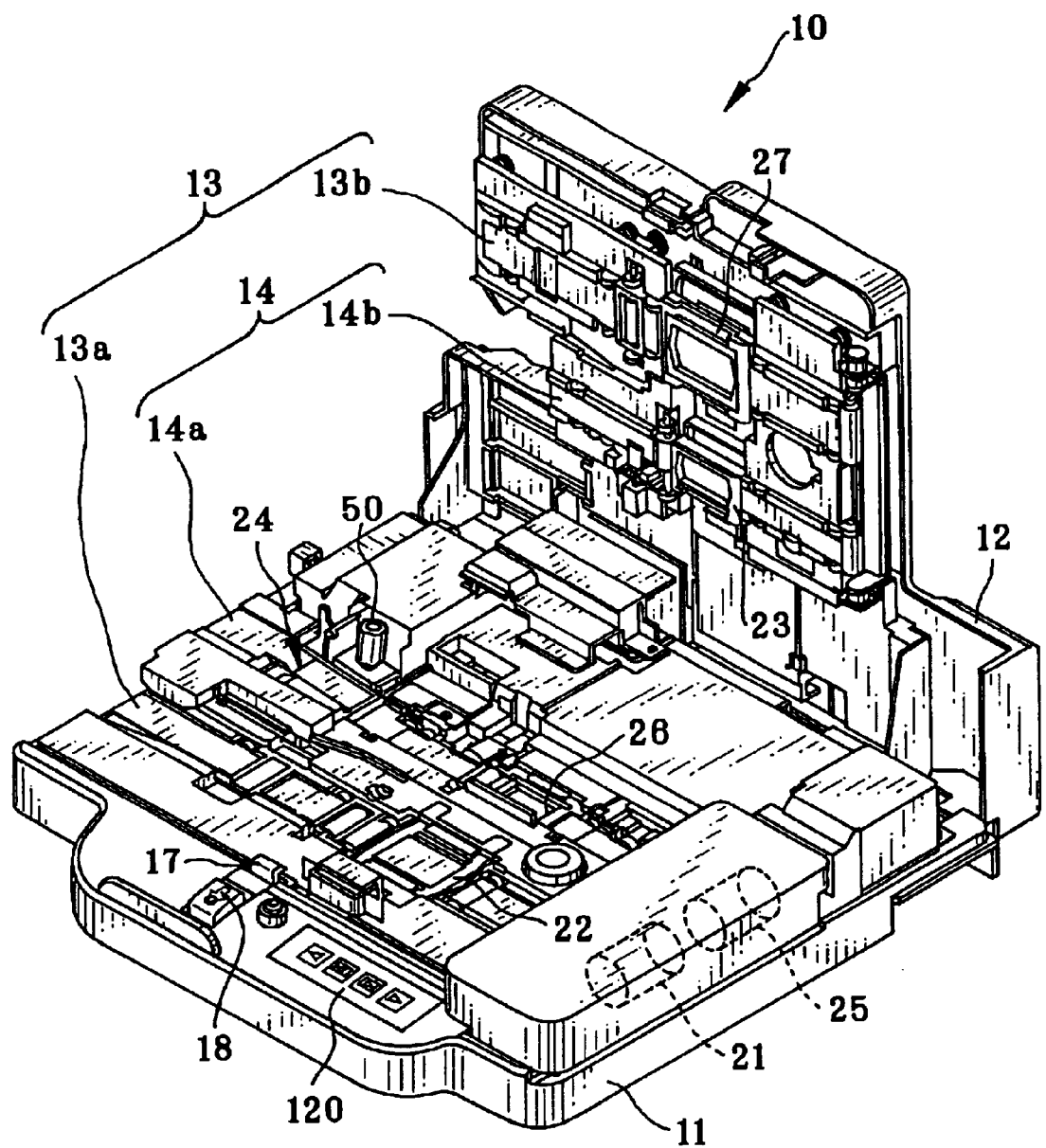
FIG. 2A is a perspective illustrating a photo film carrier of which a cover is open.
Figure 2B:
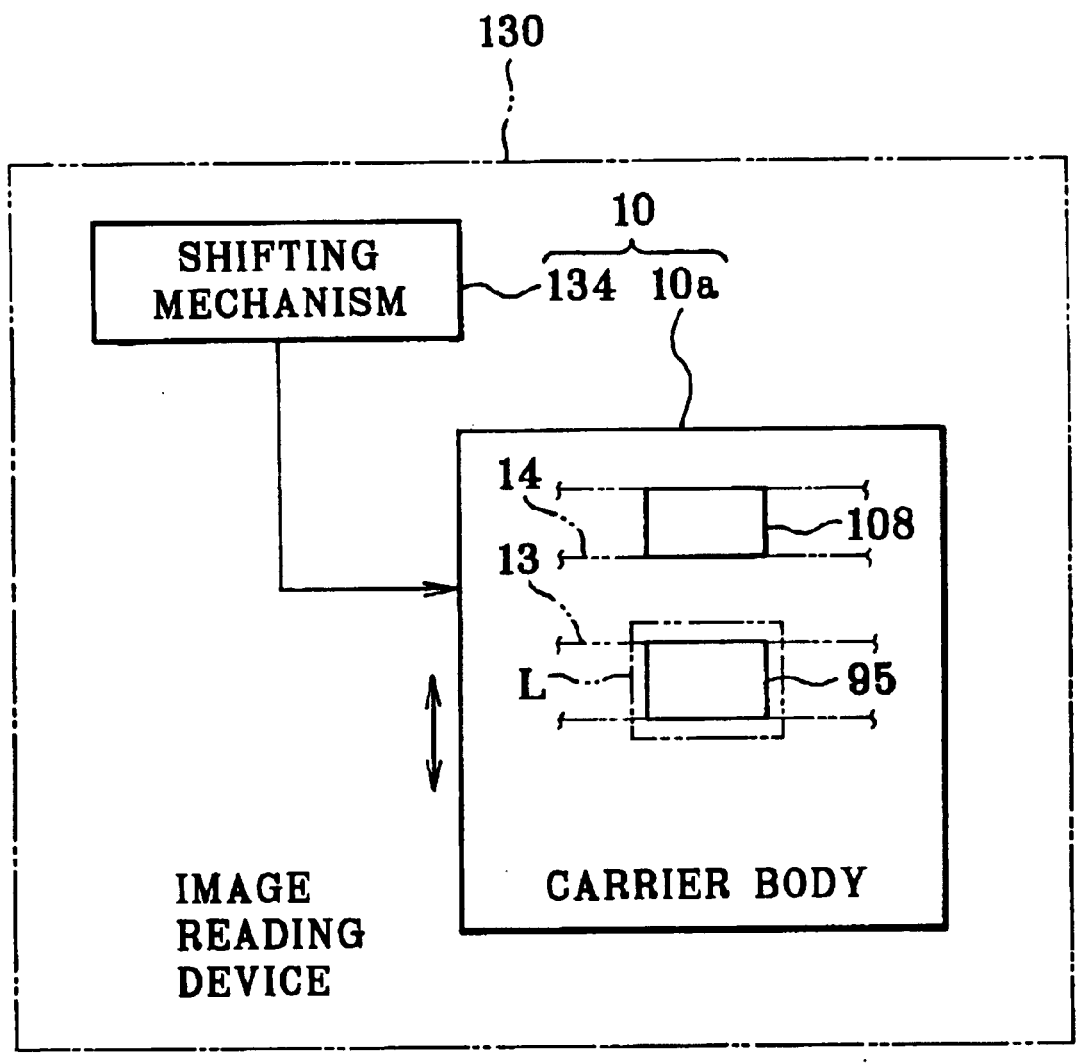
FIG. 2B is an explanatory view illustrating an image reading device and the photo film carrier including a shifting mechanism.

In FIGS. 1 and 2A, a photo film carrier 10 is constituted by a carrier base plate 11 and a cover 12. A pivot 12a of the cover 12 keeps the cover 12 rotatable on the carrier base plate 11 between erect and collapsed positions. There are two feeding paths 13 and 14 extending between the carrier base plate 11 and the cover 12 in parallel with the pivot 12a. The first feeding path 14 feeds photo film 16 of IX240 type. The second feeding path 13 feeds photo film 15 of 135 type. The two feeding paths 13 and 14 are tunnel-shaped as viewed in cross section. The second feeding path 13 has a lower wall 13a and an upper wall 13b. The first feeding path 14 has a lower wall 14a and an upper wall 14b. The lower walls 13a and 14a are included in the carrier base plate 11, and are channel-shaped as viewed in cross section. The upper walls 13b and 14b are included in the cover 12. In FIG. 2B, a shifting mechanism 134 slides a carrier body 10a of the photo film carrier 10 in a width direction of the two feeding paths 13 and 14 relative to an image reading device 130, to set a selected one of the two feeding paths 13 and 14 in the reading position L.

A spring (not shown) biases the cover 12 toward an erect position. The carrier base plate 11 includes a lock mechanism 17 and an unlocking button 18. The lock mechanism 17 locks the cover 12 in a closed position. The unlocking button 18 is operable to unlock the lock mechanism 17. When the unlocking button 18 is operated, the cover 12 rotates to an open position, to uncover the lower walls 13a and 14a and the upper walls 13b and 14b.

An entrance 20 at a first end of the second feeding path 13 is adapted for insertion of the photo film 15 of the strip-shaped type. A winding unit 21 at a second end of the second feeding path 13 winds and contains the photo film 15 after the image reading. A lower mask 22 is secured to the carrier base plate 11 in the reading position in the second feeding path 13. An upper mask 27 is secured to the cover 12 and opposed to the lower mask 22.

A photo film advancing device 24 of the invention is disposed at a first end of the first feeding path 14 and beside the entrance 20 of the second feeding path 13, for being loaded with the photo film cassette. A winding unit 25 is disposed at a second end of the first feeding path 14 for winding and reserving the photo film after reading. A lower mask 26 is secured to the carrier base plate 11 partially having the first feeding path 14, and disposed in the reading station L. An upper mask 23 is secured to the cover 12, and opposed to the lower mask 26.

Figure 3:
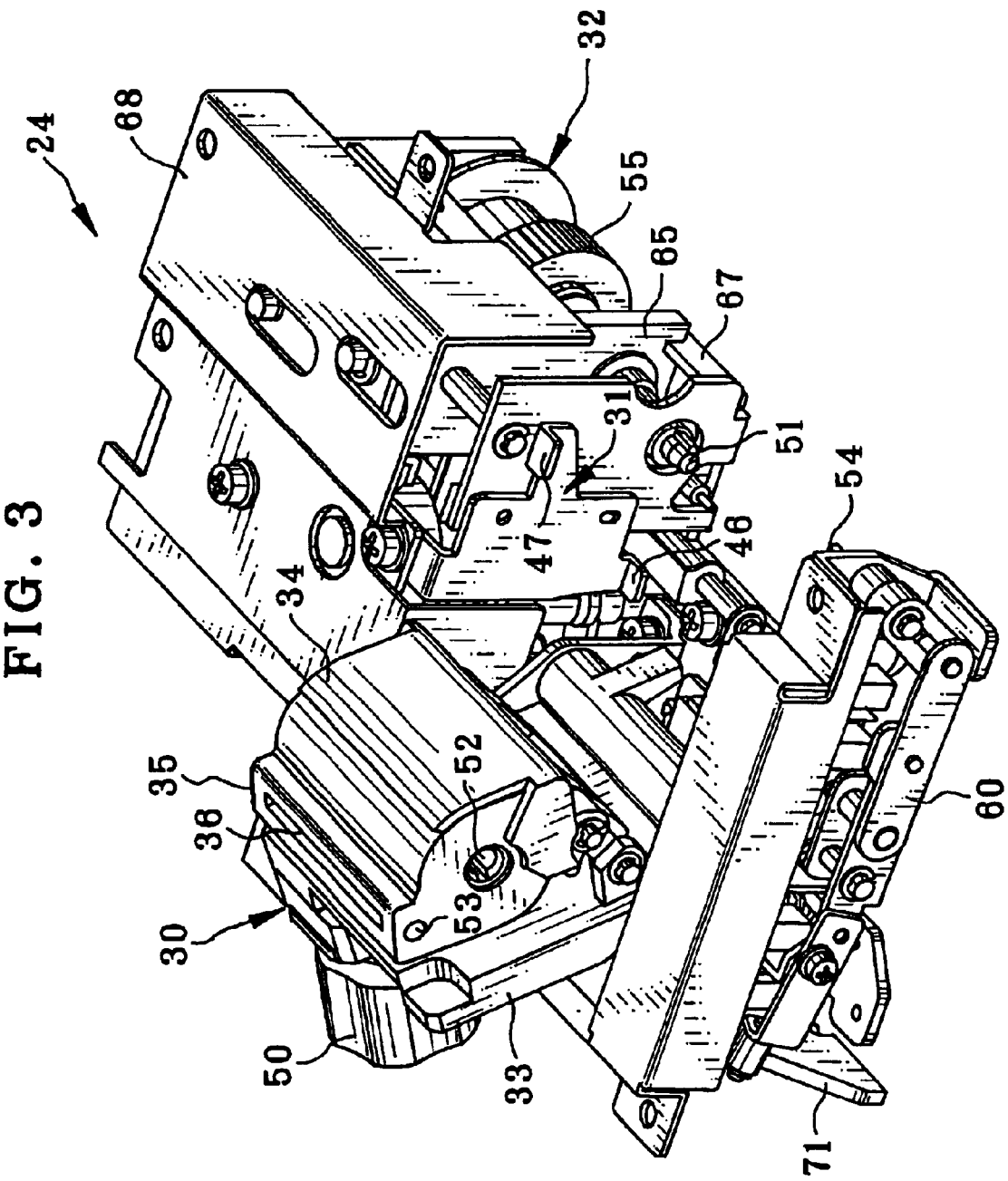
FIG. 3 is a perspective illustrating a drive unit incorporated in a photo film advancing device.

In FIG. 3, the photo film advancing device 24 is a single component including a guide holder 30, a stopper set 31 and a drive unit 32. The guide holder 30 includes a holder plate 33 and a retention arm 34, which squeezes a photo film cassette 35 between the same and the holder plate 33.

Figure 4:
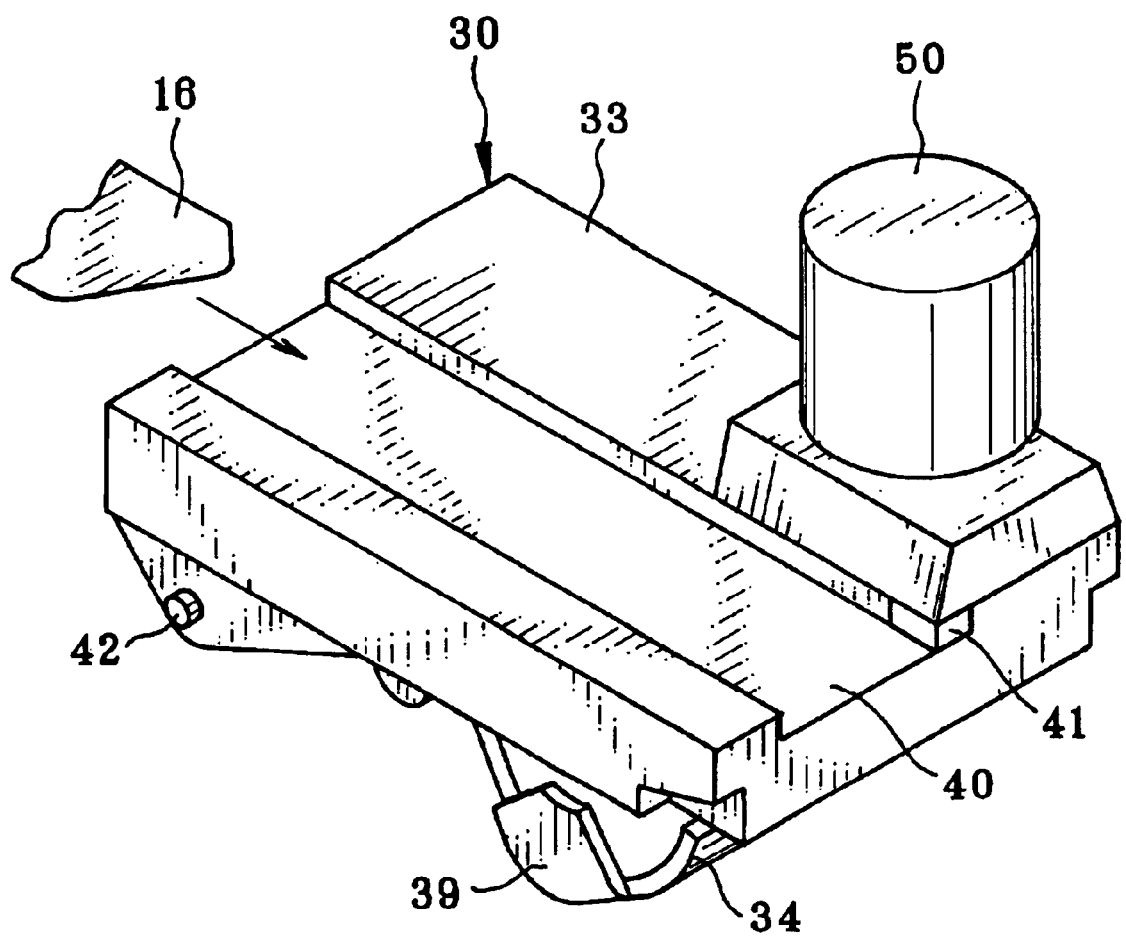
FIG. 4 is a perspective illustrating a guide holder in which a holder plate has a guide recess.

In FIG. 4, a guide recess 40 is formed in a holder outer wall of the holder plate 33, for guiding the photo film 16 of the IX240 type to the first feeding path 14. The guide recess 40 has a width according to the photo film 16, and extends along the first feeding path 14. A front edge sensor 41 is disposed in the guide recess 40, and detects a front end of the photo filmstrip.

Figure 5:
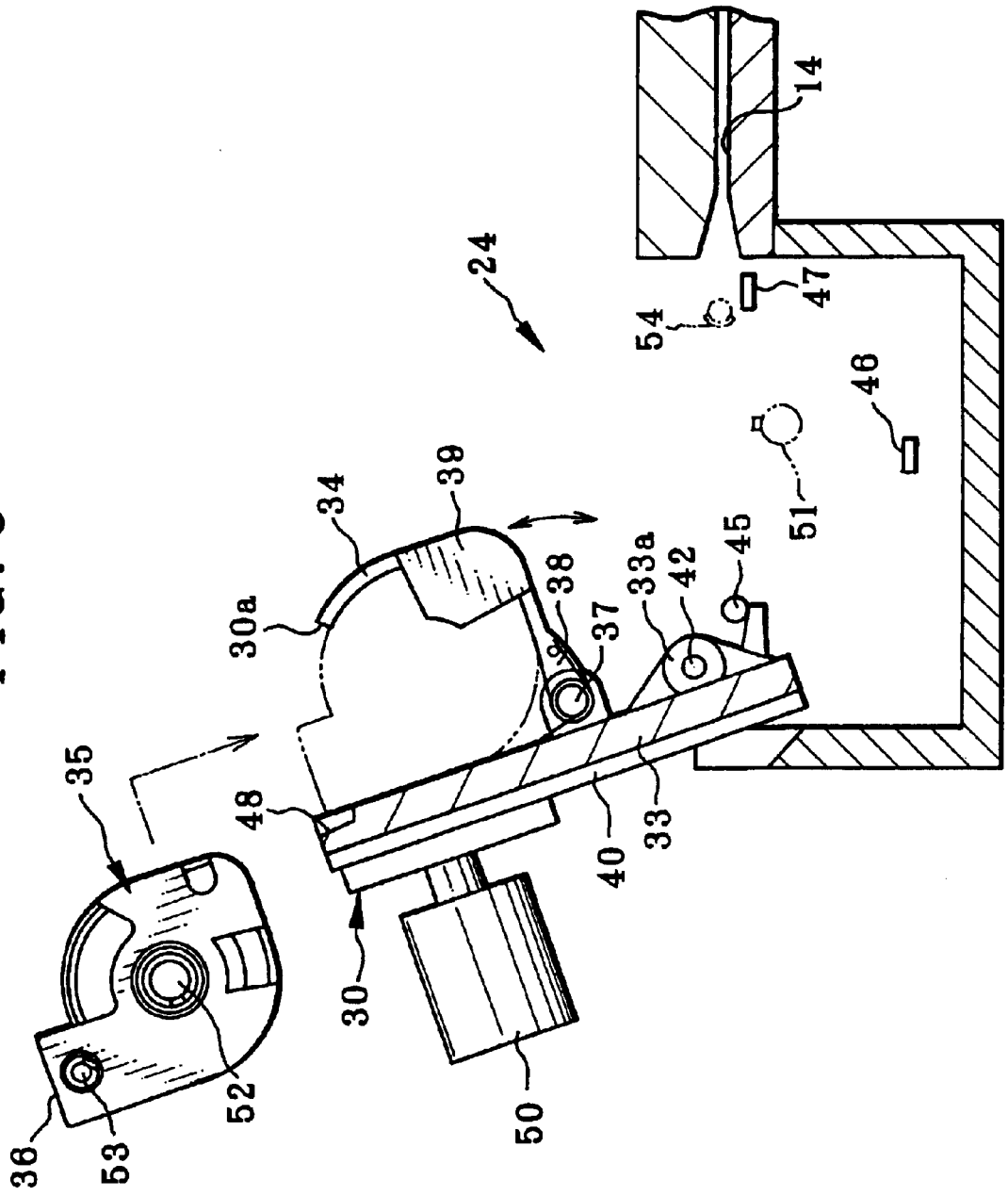
FIG. 5 is a perspective illustrating the guide holder set in a loading position.

In FIG. 5, the retention arm 34 has an L shape as viewed in section. A combination of the retention arm 34 and the holder plate 33 is channel-shaped as viewed in section. A photo film passageway 36 is formed in the photo film cassette 35, which is set between the holder plate 33 and the retention arm 34 by movement in reverse to the opening direction of the photo film passageway 36. A pivot 37 keeps the retention arm 34 rotatable between open and closed positions. A bias spring 38 biases the retention arm 34 toward the closed position. When the retention arm 34 is in the open position, a receiving gap 30a becomes wide open between the holder plate 33 and the retention arm 34, to allow insertion of the photo film cassette 35 into the receiving gap 30a. The retention arm 34, when in the closed position, comes the nearest to the holder plate 33 in the closed shape as the photo film cassette 35 does not exist. The retention arm 34, when the photo film cassette 35 is loaded, comes to a retention position defined between the open and closed positions. The bias spring 38, while the retention arm 34 is in the retention position, keeps the photo film cassette 35 retained between the retention arm 34 and the holder plate 33. Therefore, the photo film cassette 35 is held and kept from rotating. The photo film passageway 36 is kept directed in parallel with the feeding in the first feeding path 14. Ridges 39 are formed at ends of the retention arm 34, and keep the photo film cassette 35 from moving in the spool axial direction.

A hub portion 33a is formed with the holder plate 33 near to a plate edge. A linking shaft 42 is secured to the carrier base plate 11. The holder plate 33 is kept rotatable on the carrier base plate 11 by the hub portion 33a and the linking shaft 42. Therefore, the guide holder 30 is rotated from the loading position of FIG. 4 to the strip guiding position of FIG. 7 by moving past the photo film advancing position of FIG. 6. The loading position or third position is so defined as to locate the photo film passageway 36 rotationally away from the first feeding path 14 by an angle of 90 degrees or more, and is used for loading of the photo film cassette 35. The photo film advancing position or first position is defined so as to position the photo film passageway 36 at the first feeding path 14, and used for advancing the photo film into the first feeding path 14. The strip guiding position or second position is defined in the interior from the advancing position according to the rotational direction. The guide recess 40 is inclined so as to guide the photo film into the first feeding path 14.

In FIGS. 3 and 5, the stopper set 31 positions the guide holder 30 in three positions, and includes a first stopper 46, a second stopper 47 and a third stopper 45. The third stopper 45 receives the holder plate 33 having rotated from the strip guiding position toward the loading position, to position the guide holder 30 in the loading position.

The first stopper 46 and the second stopper 47 are formed by bending a single plate. See FIG. 3. The guide holder 30 is kept positioned by the first stopper 46 and the second stopper 47 in the course of rotation from the loading position to the strip guiding position.

Figure 6:
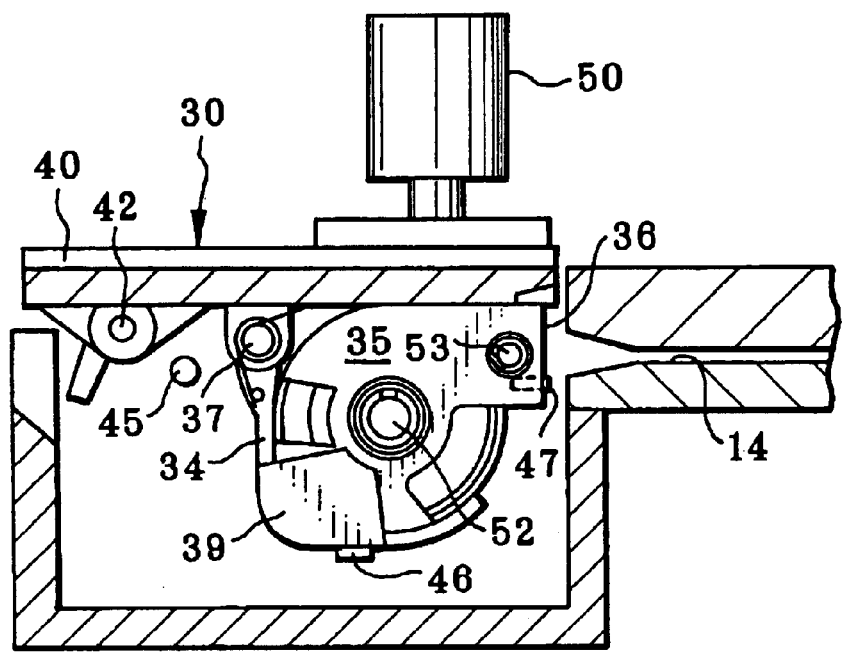
FIG. 6 is a vertical section, partially broken, illustrating the guide holder set in a photo film advancing position.
Figure 7:
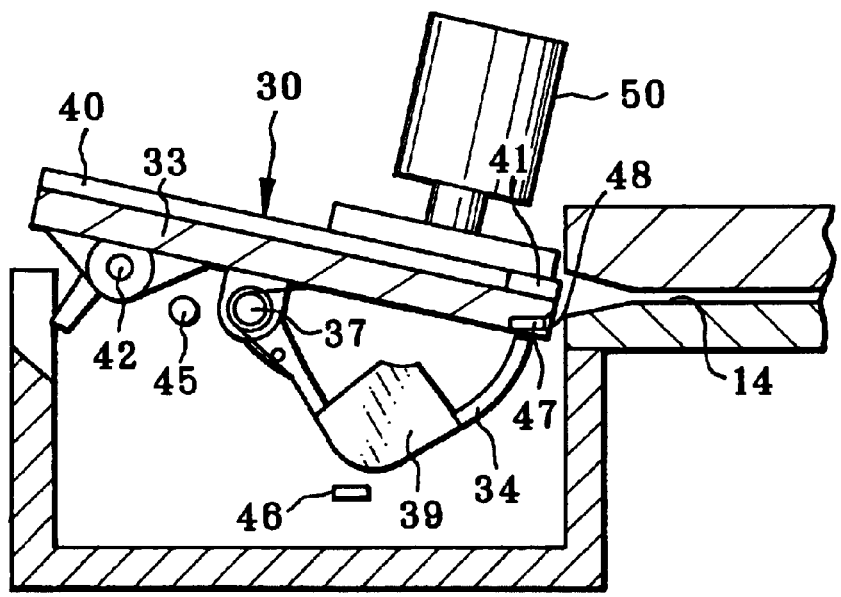
FIG. 7 is a vertical section, partially broken, illustrating the strip guiding position set in a photo film advancing position.

In FIG. 6, the first stopper 46 comes in contact with the lower face of the retention arm 34 in the retention position, so the guide holder 30 is positioned in the advancing position or first position. In FIG. 7, a recess 48 is formed in the lower wall of the holder plate 33. When the retention arm 34 is in the closed position, the second stopper 47 comes in contact with the recess 48 earlier than the first stopper 46 comes close to the retention arm 34. The guide holder 30 is stopped in the strip guiding position or second position.

While the photo film cassette 35 is held in the guide holder 30, the retention arm 34 is in the open position outside the closed position. The first stopper 46 comes in contact with the retention arm 34 earlier than the recess 48 comes close to the second stopper 47. The first stopper 46 keeps the guide holder 30 set in the photo film advancing position. In contrast, while the photo film cassette 35 does not exist in the guide holder 30, the retention arm 34 is in the closed position that is inside the open position. The second stopper 47 comes in contact with the recess 48 earlier than the retention arm 34 comes close to the first stopper 46. The second stopper 47 keeps the guide holder 30 set in the strip guiding position.

Therefore, the stopper set 31 keeps the guide holder 30 positioned automatically in the positions according to existence and lack of the photo film cassette 35, typically by utilizing the difference in the position of the retention arm 34 relative to the holder plate 33. A grip projection portion 50 protrudes from a rear of the holder plate 33. The grip projection portion 50 is manually grasped for opening and closing the guide holder 30, and also is a weight for directing the guide holder 30 down to the first stopper 46 and the second stopper 47 under gravity.

In FIG. 3, the retention arm 34 is movable between an engaging position and a disengaging position in the spool axial direction relative to the holder plate 33. The retention arm 34, when in the engaging position on the left side, is engageable with a spool drive shaft 51 to be described later, and when in the disengaging position on the right side, is away from the spool drive shaft 51. A spring (not shown) biases the retention arm 34 toward the disengaging position. A key way is formed in each of spool axial ends 52 of the spool, and appears in each end face of the photo film cassette 35. When the guide holder 30 is in the photo film advancing position, the spool drive shaft 51 becomes engaged with the spool axial end 52. Before the engagement, the retention arm 34 and the photo film cassette 35 move toward the engaging position because the photo film cassette 35 is pushed by the spool drive shaft 51.

The photo film cassette 35 includes a cassette shutter, disposed in an inner position of the photo film passageway 36, for opening and shutting the photo film passageway 36. Two shutter axial ends 53 of the cassette shutter have a key way, and appear in lateral faces of the photo film cassette 35. A cassette shutter drive shaft 54 is disposed opposite to the spool drive shaft 51. The spool axial end 52 become coupled with a cassette shutter drive shaft 54 as the retention arm 34 moves with the photo film cassette 35 to the engaging position.

Figure 8:
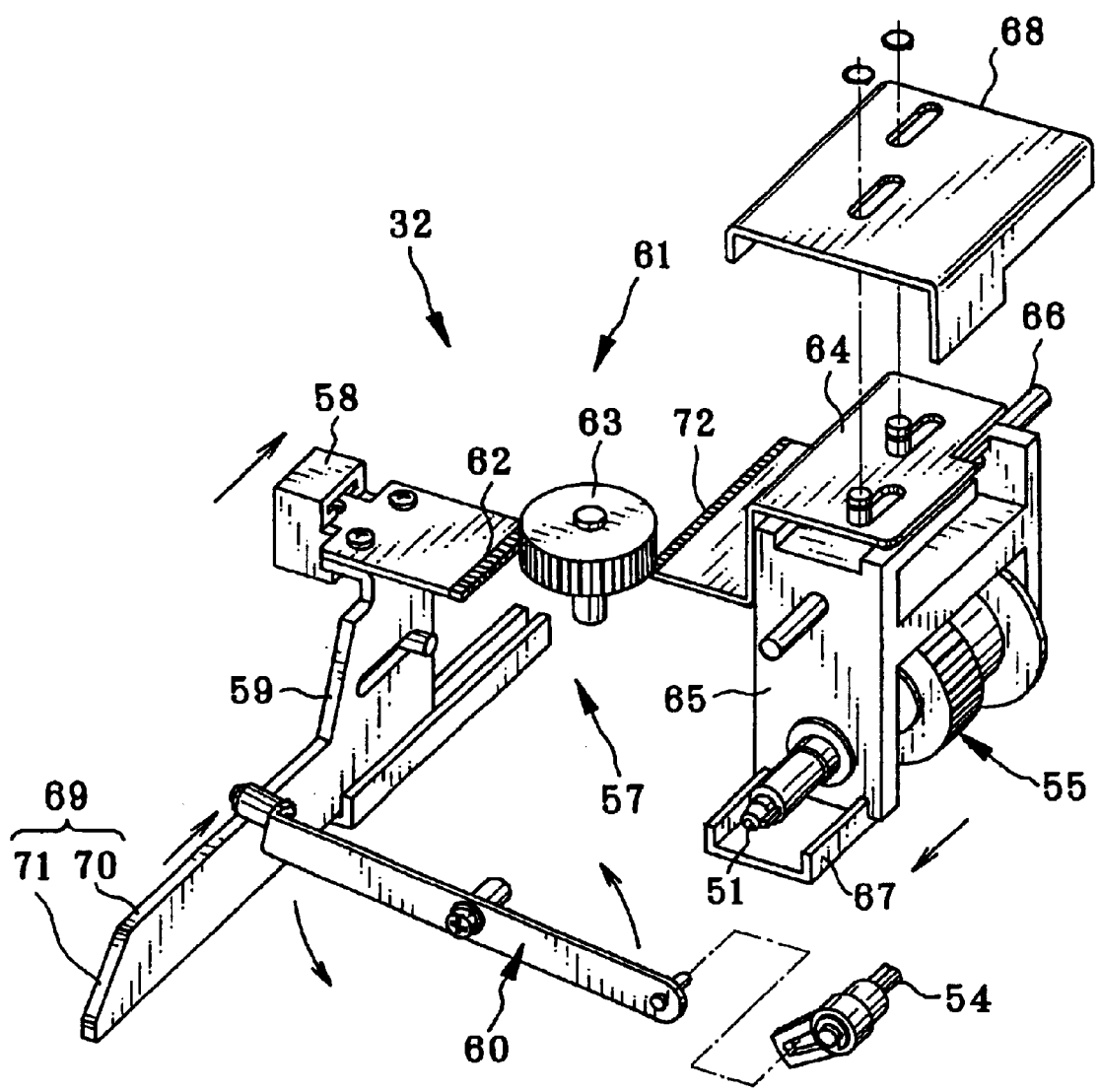
FIG. 8 is an exploded perspective illustrating the drive unit incorporated in the photo film advancing device.

In FIG. 8, the drive unit 32 includes a spool drive mechanism 55, the cassette shutter drive shaft 54 and a drive transmission mechanism 57. The spool drive mechanism 55 includes the spool drive shaft 51. The drive transmission mechanism 57 includes an external slider 58 or lever, a sliding plate 59, a transmission lever 60, and a transmission mechanism 61. The external slider 58 is movable in the spool axial direction between a first position for starting advancing the photo film and a second position for completing the operation. After the guide holder 30 is set in the photo film advancing position, the external slider 58 is manually slid by an operator.

The transmission mechanism 61 is constituted by a first transmission rack 62, a transmission gear 63, a transmission plate 64 and a support frame 65. Rotation of the external slider 58 is utilized to move the spool drive shaft 51 in the axial direction. The first transmission rack 62 is formed at the end of the external slider 58, and meshed with the transmission gear 63. A second transmission rack 72 is formed with a first edge of the transmission plate 64, and meshed with the transmission gear 63. A second edge of the transmission plate 64 is connected with the support frame 65. The support frame 65 supports the spool drive shaft 51 in a rotatable manner. A guide rod 66 and a sliding rail 67 are fastened to the carrier base plate 11, and guide the support frame 65, which is movable in the spool axial direction.

A press plate 68 is disposed higher than the support frame 65 and fastened to the carrier base plate 11. One portion of the transmission plate 64 is sandwiched between the press plate 68 and the support frame 65. Friction created between those elements causes the support frame 65 to move together in the spool axial direction. As load is applied to the support frame 65, slip between the transmission plate 64 and the press plate 68 causes disconnection from the support frame 65. The spool drive shaft 51 is moved in the spool axial direction, pushes the photo film cassette 35 to shift the retention arm 34 toward the engaging position. Then the spool drive shaft 51 enters the spool axial end 52 of the spool. The cassette shutter drive shaft 54 enters the shutter axial end 53 of the cassette shutter upon the movement of the retention arm 34 to the engaging position with the photo film cassette 35.

A mechanism for opening and shutting the cassette shutter of the photo film cassette 35 is constituted by the external slider 58, the sliding plate 59 and the transmission lever 60. The sliding plate 59 moves together with the external slider 58 in the spool axial direction. A cam surface 69 of a cam mechanism is included in an end portion of the sliding plate 59, and engageable with the transmission lever 60. One end portion of the transmission lever 60 is engaged with the cam surface 69. A shaft at a second end portion of the transmission lever 60 is linked with the cassette shutter drive shaft 54, which is rotated within a predetermined angular range by a shift of the cam surface 69. The cam surface 69 includes a non-transmission section 70 and a transmission section 71. The non-transmission section 70 does not operate for transmission, and does not rotate the cassette shutter drive shaft 54. The transmission section 71 operates after the spool drive shaft 51 becomes engaged with the spool, and causes the cassette shutter drive shaft 54 to rotate. An initial portion of operation of the external slider 58 causes the spool drive shaft 51 to push the photo film cassette 35, which is moved in the spool axial direction within the guide holder 30. The cassette shutter drive shaft 54 becomes engaged with the shutter axial end 53. After the movement of the photo film cassette 35 is blocked, the spool drive shaft 51 becomes engaged with the spool axial end 52. Operation of the external slider 58 after this causes the cassette shutter drive shaft 54 to rotate to open the cassette shutter. At this time, the spool drive shaft 51 is firmly entered in the spool axial end 52 to block further entry. The support frame 65 receives load, and becomes disconnected from the transmission plate 64. So the support frame 65 does not move.

Figure 9:
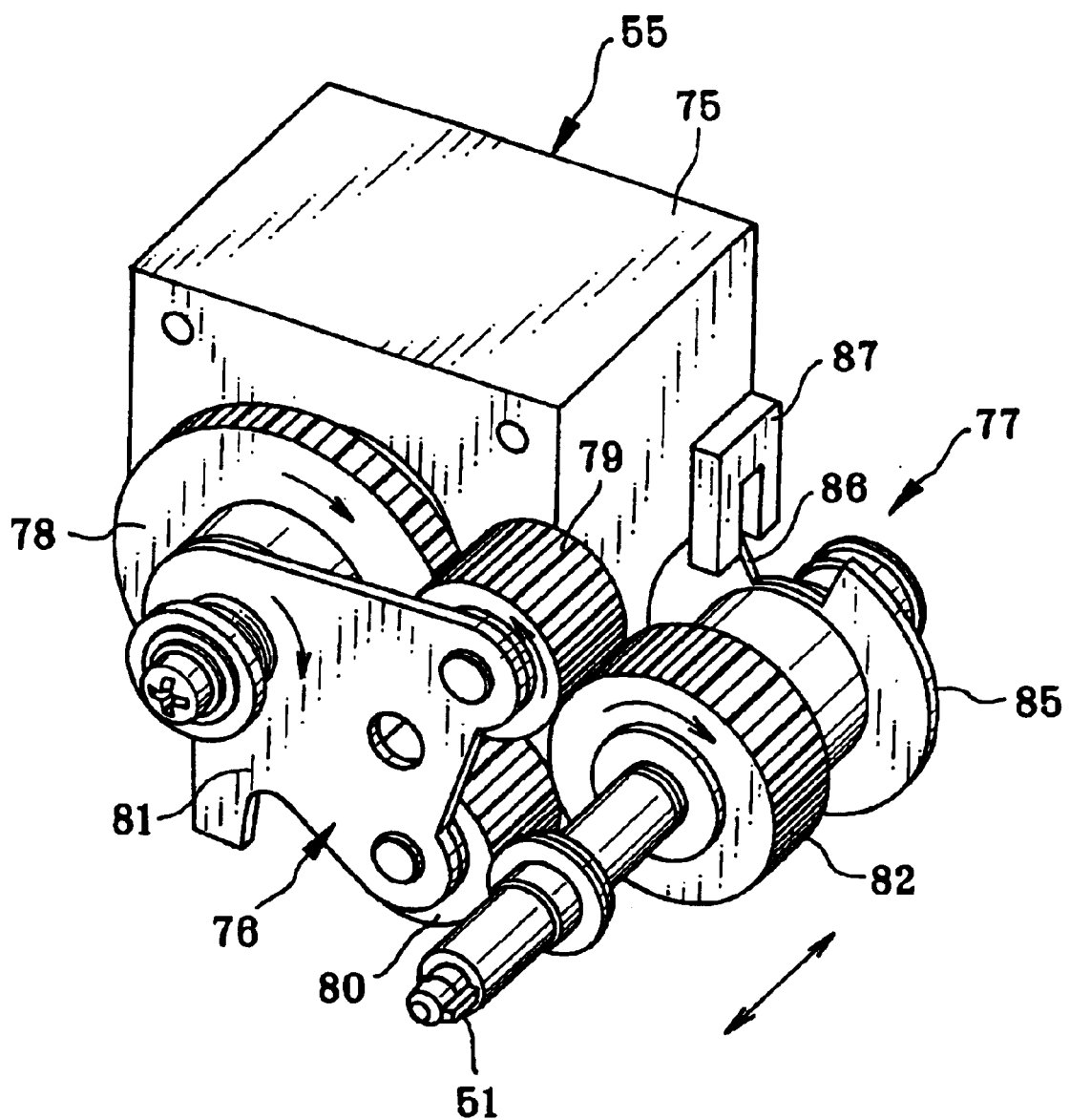
FIG. 9 is a perspective illustrating a spool drive mechanism.

In FIG. 9, the spool drive mechanism 55 includes the spool drive shaft 51 and also a motor 75, a planetary gear mechanism 76 and a rotational position detector 77. The planetary gear mechanism 76 includes a sun gear 78, planet gears 79 and 80, a transmission plate 81. The sun gear 78 is an input element rotated by the motor 75. The planet gears 79 and 80 are not meshed with each other, and are supported by the transmission plate 81 for being meshed with the sun gear 78 in an individual manner. The transmission plate 81 causes the planet gears 79 and 80 to rotate about an axis of the sun gear 78, so an auxiliary gear 82 fixed on the spool drive shaft 51 is meshed with either one of the two. In the present embodiment, forward rotations of the motor 75 cause the planet gear 79 to make a clockwise rotation toward the auxiliary gear 82 about the sun gear 78. Backward rotations of the motor 75 cause the planet gear 80 to make a counterclockwise rotation toward the auxiliary gear 82 about the sun gear 78.

The planetary gear mechanism 76 being connected between the spool drive shaft 51 and the motor 75, the planet gear 79 rotates about the axis outside itself in a direction for disengagement from the auxiliary gear 82, so the rotation of the motor 75 is prevented from influencing rotation of a photo film feeding motor, which will be described later. The support frame 65 supports the spool drive shaft 51, the auxiliary gear 82, a disk 85 and a sensor 87. The auxiliary gear 82 and the planet gears 79 and 80 have such a great thickness that the meshed state is kept even if the support frame 65 moves in the spool axial direction.

A first rotational position of the photo film cassette 35 is predetermined for stopping the spool while the developed photo film is contained. The spool must be stopped in a suitable manner for ensuring coupling with the spool by designating a rotational position of the spool drive shaft 51. To this end, the rotational position detector 77 is used, and includes the disk 85 and the sensor 87. A notch 86 is formed in the disk 85. The sensor 87 detects an edge of the notch 86. The disk 85 is fastened coaxially with the spool drive shaft 51. The sensor 87 sends a detection signal by detecting an edge of the notch 86 to designate a rotational position of the spool.

Figure 10:
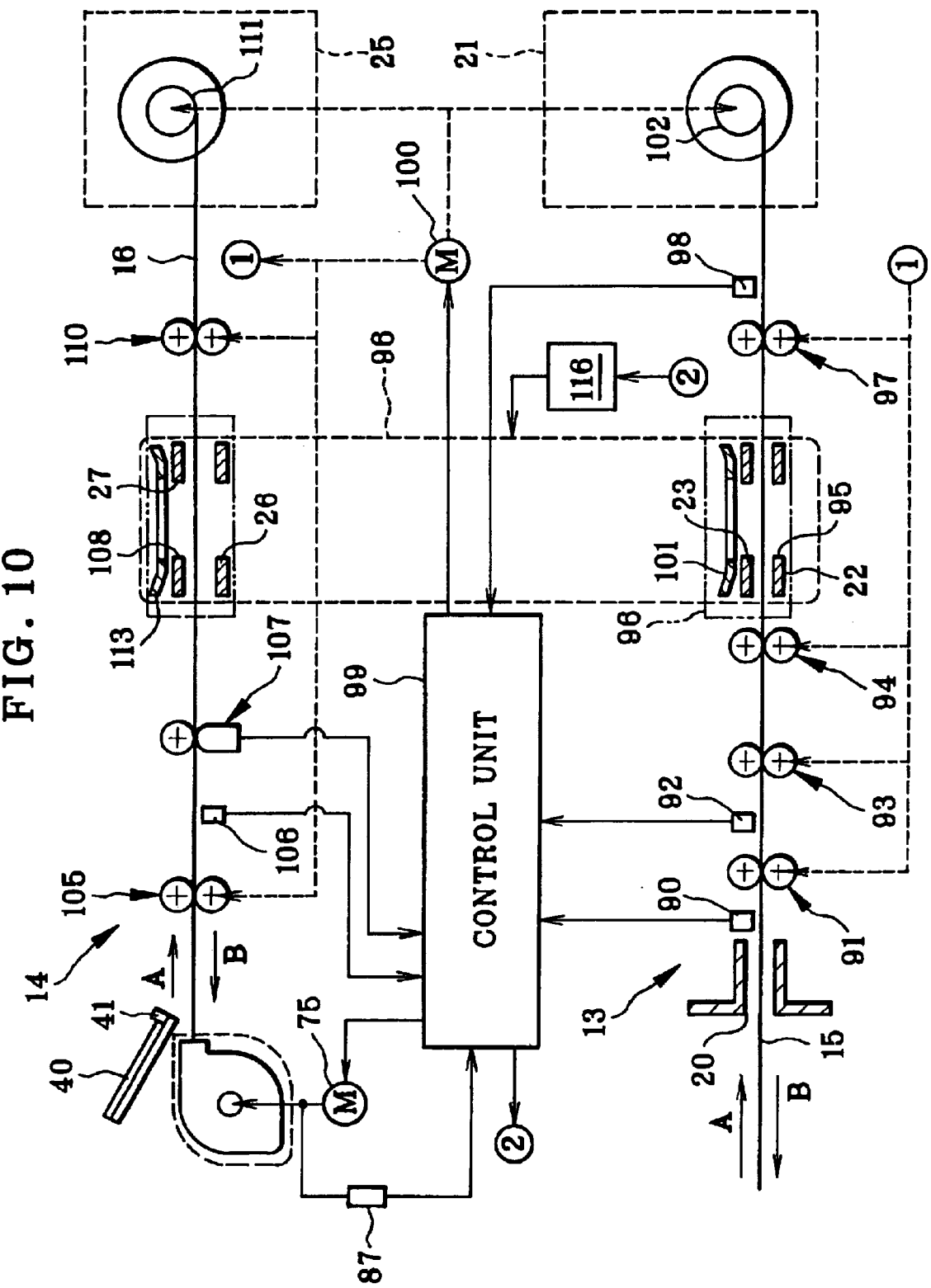
FIG. 10 is an explanatory view illustrating two feeding paths and elements relevant to those.

In FIG. 10, the second feeding path 13 is provided with a series of elements, including an end sensor 90, a feeding roller set 91, a perforation sensor 92, feeding roller sets 93 and 94, a reading opening 95, a photo film press mechanism 96, a feeding roller set 97 and a perforation sensor 98. The photo film 15 exited from the feeding roller set 97 is guided to the winding unit 21.

The end sensor 90 detects insertion of a front end of the photo film 15. A control unit 99 is supplied with a detection signal from the end sensor 90. According to the detection signal, a feeding motor 100 is controlled by the control unit 99 with a motor driver (not shown) to rotate forwards. The rotations of the feeding motor 100 are transmitted to the feeding roller sets 91, 93, 94 and 97 by timing belts, pulleys and the like (not shown). Therefore, the feeding roller sets 91, 93, 94 and 97 rotate in synchronism, to draw the photo film 15 into the second feeding path 13. Note that directions A and B are defined in such a manner that the photo film, upon forward rotations of the feeding motor 100, is transported in the direction A, and upon backward rotations of the feeding motor 100, is transported in the direction B.

The perforation sensor 92 detects each perforation of the photo film 15, and sends the control unit 99 a perforation detection signal. The control unit 99 counts the perforation detection signal, and controls feeding by one frame according to the counted number.

The reading opening 95 is formed in a portion of the second feeding path 13 as a reading position. Light is emitted by a light source incorporated in the image reading device 130, and travels up through the reading opening 95. The image reading device 130 has a CCD, which is positioned on a side opposite to a light source with reference to the photo film carrier 10, and reads frame images of the photo film 15 by detection of light passed through the photo film 15.

The lower mask 22 and the upper mask 27 are set at the reading opening 95. In the photo film press mechanism 96, a photo film setting plate 101 is pressed toward the lower mask 22 with the upper mask 27, to flatten an image frame of the photo film 15 at the reading opening 95. A winder shaft 102 is provided in the winding unit 21. The winder shaft 102 is rotated by rotation of the feeding motor 100, and winds and reserves the photo film 15. It is to be noted that a separate winding motor may be used instead of the use of the feeding motor 100.

The first feeding path 14 has a series of elements including a feeding roller set 105, a perforation sensor 106, a magnetic reading head 107, a reading opening 108, a feeding roller set 110 and the winding unit 25, which are arranged in a sequence from the loader unit.

The feeding roller sets 105 and 110 rotate in synchronism with each other in response to rotation of the feeding motor 100. A winder shaft 111 is disposed in the winding unit 25, and is rotated by rotation of the feeding motor 100, to wind the photo film 16 for reservation in a temporary manner. As the feeding motor 100 rotates forwards, the photo film 16 is fed in the direction A from the photo film advancing device 24 toward the reading opening 108. When the feeding motor 100 rotates backwards, the photo film 16 is fed back in the direction B towards the photo film cassette 35.

In the present embodiment, the feeding motor 100 being single causes the feed roller sets in the two feeding paths 13 and 14 and also the winder shafts 102 and 111. This is effective in lowering the cost and the reducing the device size. However, plural motors may be used as desired for separated driving of the elements.

The magnetic reading head 107 reads information from magnetic recording layer in the photo film 16 of the IX240 type, and sends the information to the control unit 99, the information including photograph taking information. The perforation sensor 106 detects each perforation in the photo film 16, and sends a detection signal to the control unit 99.

The lower and upper masks 26 and 23 are set at the reading opening 108. A photo film setting plate 113 is caused by the photo film press mechanism 96 to push the upper mask 23 toward the lower mask 26, so as to keep each image frame sufficiently flat at the reading opening 108.

A single solenoid 116 as actuator causes the photo film setting plates 101 and 113 to move at the reading openings 95 and 108. The control unit 99 controls the solenoid 116, which is driven after each image frame is set at the reading openings 95 and 108.

The operation of the above embodiment is described now. To read the photo film 16 of the IX240 type, the photo film carrier 10 is shifted to set the reading opening 108 of the first feeding path 14 at the reading position of the image reading device 130.

Then the photo film cassette 35 containing the photo film 16 of IX240 type is loaded. At first, the grip projection portion 50 is manually pinched to pull up the guide holder 30 in the loading position. The guide holder 30 contacts the third stopper 45, and is kept in the contact with the same. The photo film cassette 35 is inserted into the receiving gap 30a between the holder plate 33 and the retention arm 34.

The retention arm 34 is opened toward the open position against the bias of the bias spring 38. Then the body portion of the photo film cassette 35 is fitted on the retention arm 34 so as to return the retention arm 34 to the retention position. The photo film cassette 35 is thus held in the guide holder 30 with the photo film passageway 36 directed upwards.

After loading of the photo film cassette 35 is completed, the grip projection portion 50 is pinched to swing the guide holder 30. As the retention arm 34 is in the retention position, the first stopper 46 comes in contact with the retention arm 34 earlier than the second stopper 47 comes close to the recess 48, to set the guide holder 30 in the photo film advancing position. Therefore, the photo film passageway 36 of the photo film cassette 35 is positioned at the first feeding path 14 with respect to the height direction.

Then the external slider 58 is operated. A position of completion of the operation of the external slider 58 is preset as a home position. The external slider 58 is slid from the home position to the feeding starting position. In the range of the operation, the initial half portion of the operation of the external slider 58 causes the spool drive shaft 51 to move in the spool axial direction. The photo film cassette 35 is readily located where the spool drive shaft 51 is directed. When the spool drive shaft 51 is moved in the spool axial direction, an end of the spool drive shaft 51 pushes the spool axial end 52 in the spool axial direction. Thus, the photo film cassette 35 moves in the spool axial direction with the retention arm 34 relative to the holder plate 33.

The cassette shutter drive shaft 54 is disposed on the side opposite to the spool drive shaft 51 with respect to the photo film cassette 35. The photo film cassette 35 is moved, so the shutter axial end 53 receives insertion of the cassette shutter drive shaft 54. Then the retention arm 34 is moved to the engaging position on the left side, to fit the spool drive shaft 51 in the spool axial end 52. Thus, the photo film passageway 36 is positioned at the first feeding path 14 for the IX240 type with reference to the photo film width direction. As one end of the transmission lever 60 is engaged with the non-transmission section 70 of the cam surface 69, the cassette shutter drive shaft 54 is kept from rotating. After this, the external slider 58 is operated toward the advance starting position. The transmission plate 64 is slipped from the support frame 65 to release retention of the spool drive shaft 51. As one end portion of the transmission lever 60 is engaged with the transmission section 71 of the cam surface 69, the cassette shutter drive shaft 54 rotates to cause the cassette shutter of the photo film cassette 35 to rotate to the open position.

After the external slider 58 is set, a reading button 120 is operated. See FIG. 1. The control unit 99 drives the motor 75 and the feeding motor 100 for forward rotation.

When the motor 75 for the spool driving rotates forwards, the spool rotates in the unwinding direction. When the feeding motor 100 rotates forwards, the feeding roller sets 105 and 110 rotate for transport of the photo film 16 in the direction A. The speed of drawing the photo film by the feeding roller sets 105 and 110 is higher than the photo film transport by the spool drive shaft 51. In FIG. 10, the auxiliary gear 82 which is coaxial with the spool drive shaft 51 causes the planet gear 79 to rotate in a direction for disengagement. The spool drive shaft 51 is released from being driven by the motor 75. Therefore, only the feeding roller sets 105 and 110 operate for the transport after this.

The photo film 16 is fed by the feeding roller set 105 toward the reading opening 108. As the photo film setting plate 113 at the reading opening 108 is set in an upper position, the photo film 16 is allowed to pass. A leading end of the photo film 16 is wound about the winder shaft 111. In the course of winding, the perforation sensor 106 detects perforations. The magnetic reading head 107 reads the photograph taking information. The information is sent to the image reading device 130. The control unit 99, in response to detection signals in the number according to an amount of advancing the photo film, stops the motor 75 and the feeding motor 100. A first frame image is set at the reading opening 108.

When an image frame is finally set at the reading opening 108, the control unit 99 drives the solenoid 116 to shift the photo film setting plate 113 to a position of pressing the photo film. After this, a pre-scanning start signal is sent to the image reading device 130. The operation of pre-scanning is to read the image frames at a relatively low precision, to calculate and obtain pre-scanning information by each frame, the pre-scanning information including correction data or the like for correcting data which will be read in the fine scanning. The pre-scanning information of those image frames is stored in the image reading device 130 in combination with image frames. After the storing operation, the image reading device 130 sends a completion signal to the control unit 99 for informing the completion of retrieval of the information. In response to the signal, the control unit 99 operates for shifting the photo film setting plate 113 to the retracted position, and then drives the motor 75 and the feeding motor 100 to transport the photo film 16 by one frame. As has been described heretofore, the photo film is fed by one frame in one direction, while the photograph taking information, pre-scanning information and the like is retrieved. Then information of a final image frame is retrieved, when transport of the photo film 16 is stopped.

Then the image reading device 130 reads an image frame by fine scanning according to the obtained information in a backward order from the final image frame. The control unit 99, after receiving the reading completion signal from the image reading device 130, causes the feeding motor 100 and the motor 75 to rotate backwards. The photo film 16 is wound back into the photo film cassette 35 by one frame, while the image frames are read.

When reading all the image frames, a predetermined time starts being measured. Upon lapse of this, the feeding motor 100 and the motor 75 are stopped. As a result, all the photo film 16 is wound and contained in the photo film cassette 35. Note that the motor 75 is stopped upon generation of a detection signal from the sensor 87 which detects an edge of the notch 86 of the disk 85. Therefore the spool can be stopped and retained in the prescribed rotational position.

When the motor 75 stops, an indicator lamp is turned on for informing readiness for exchange of the cassette. After the indication is checked, the external slider 58 is moved to the completion position. An initial operation of the external slider 58 causes the cassette shutter drive shaft 54 to rotate the cassette shutter to the closed position. The operation after this causes the spool drive shaft 51 to move to the disengaging position. The retention arm 34 receives pulling force from the spool drive shaft 51 with the photo film cassette 35, so that the cassette shutter drive shaft 54 moves away from the shutter axial end 53. After this, the retention arm 34 moves to the disengaging position on the right side, to remove the spool drive shaft 51 from the spool axial end 52 of the spool. Thus, the return of the external slider 58 to the completion position disengages the spool drive shaft 51 from the cassette shutter drive shaft 54 of the photo film cassette 35. The cassette shutter turns to close the photo film passageway 36. After the return of the external slider 58 is completed, the grip projection portion 50 is raised manually to pull up the guide holder 30. The guide holder 30 is retained in the loading position, where the photo film cassette 35 is removable.

Now, reading of image from the photo film 16 in the strip form is described. The guide holder 30 without the photo film cassette 35 is swung down. As the retention arm 34 is in the closed position, the second stopper 47 comes in contact with the recess 48 in the holder plate 33 earlier than the first stopper 46 comes close to the retention arm 34. So the guide holder 30 is set in the strip guiding position. The guide recess 40 formed in the holder plate 33 is inclined to guide the photo film 16 to the first feeding path 14. The photo film 16 is inserted by movement inside the guide recess 40. The front edge sensor 41 disposed at the guide recess 40 detects a leading end of the photo film 16. A detection signal from the front edge sensor 41 is sent to the control unit 99, which causes the feeding motor 100 to rotate forwards upon receipt of the detection signal.

When the feeding roller sets 105 and 110 rotate, the photo film 16 is automatically fed to the first feeding path 14 even the photo film 16 has been inserted with a small depth. As has been described heretofore, the photo film 16 is fed in one direction frame by frame, and is pre-scanned simultaneously. After pre-scanning all the image frames, the photo film 16 is transported backwards frame by frame, to read all the image frames. After all the image frames are read, the photo film 16 is guided through the guide recess 40 and exited.

Reading of images from the photo film 15 of 135 type is now described. The carrier body 10a of the photo film carrier 10 is shifted to set the reading opening 95 in the reading station L of the image reading device 130. Then the photo film 15 of the strip form is inserted into the entrance 20 of the second feeding path 13. A leading end of the photo film 15 is detected by the end sensor 90. In response to this, the feeding motor 100 is caused to rotate forwards. After this, the feeding roller sets 91, 93, 94 and 97 transport the photo film 15 toward the reading opening 95. In the manner similar to the above, the photo film 15 is pre-scanned in the transport in a forward direction. After pre-scanning all the image frames, the image frames in the photo film 15 are read in the transport in a backward direction. After all the image frames are read, the photo film 15 is exited through the entrance 20.

In the above embodiment, the weight of the holder plate 33 and/or the grip projection portion 50 sets the guide holder 30 to the positions of the stoppers under gravity. Furthermore, a mechanism for stopping the holder plate with clicks can be used for retention of the guide holder 30 with sufficient tightness in the positions of the stoppers.

Also, a spring may be used for biasing the guide holder 30 toward the strip guiding position instead of using the grip projection portion 50. Furthermore, the guide holder 30 may be biased toward the photo film advancing position instead of the strip guiding position.

In the above embodiment, the photo film advancing device is incorporated in the photo film carrier 10 in the invention. However, the photo film advancing device may be incorporated in any suitable optical instrument for use with photo film.

In the above embodiment, the photo film carrier is used in the image reading device 130. However, a photo film carrier of the invention may be used in various optical instruments or devices for use with the photo film, for example, a photographic printer, digital printer for use with photographic paper, photographic processor, printer/processor including a printer component and a processor component, and the like.

Instead of the intermittent transport of the photo film, it is also possible to transport the photo film continuously in the photo film carrier. In synchronism with the continuous transport of the photo film in the sub scan direction, a line CCD or the like is used for scanning the photo film in the main scan direction or the photo film width direction, to read image frames.

Figure 11:
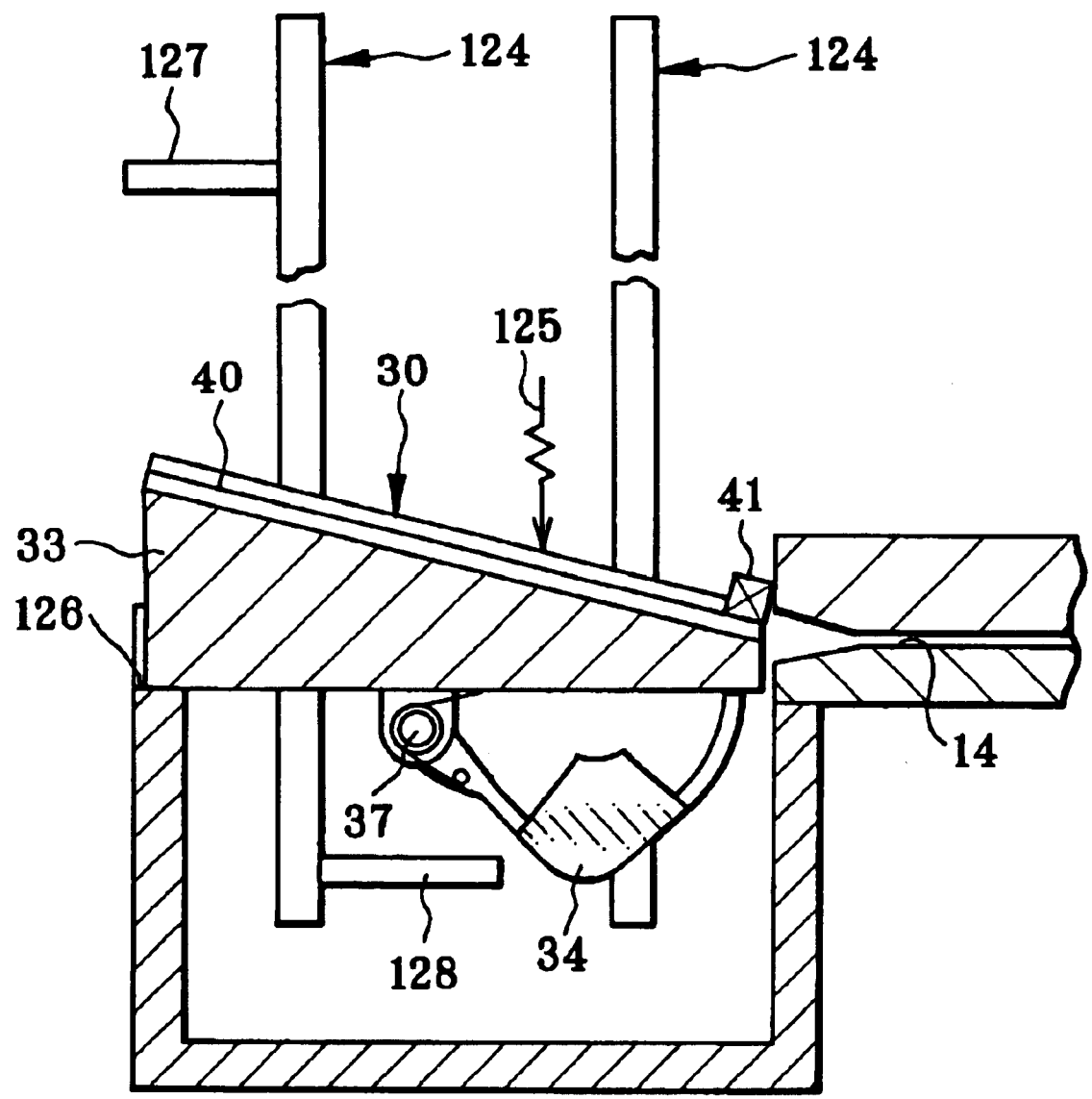
FIG. 11 is a vertical section, partially broken, illustrating another preferred photo film carrier in which a holder plate in a guide holder is vertically moved.
Figure 12:
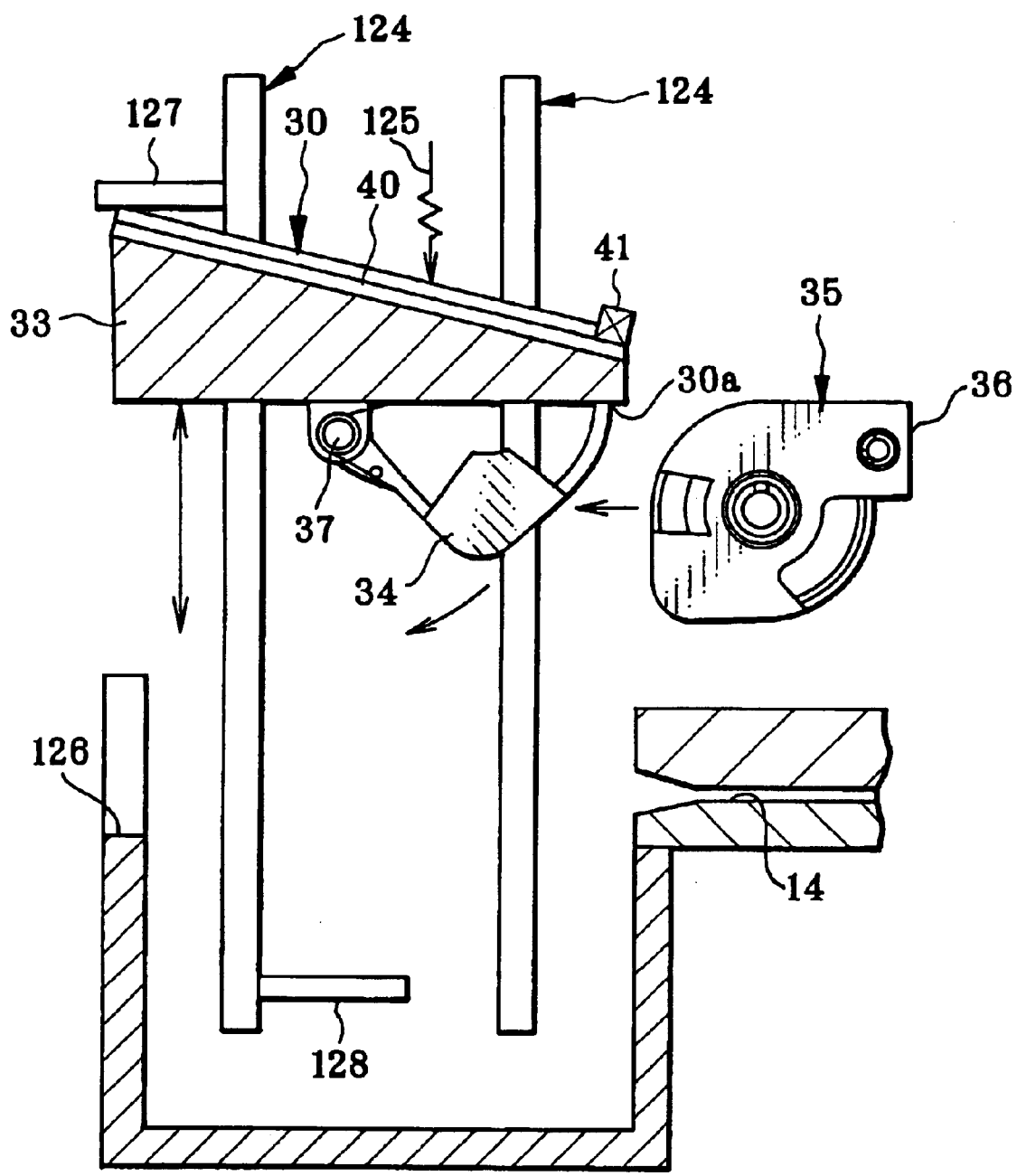
FIG. 12 is a vertical section, partially broken, illustrating the same as FIG. 11 but in a state where the guide holder is ready for loading.
Figure 13:
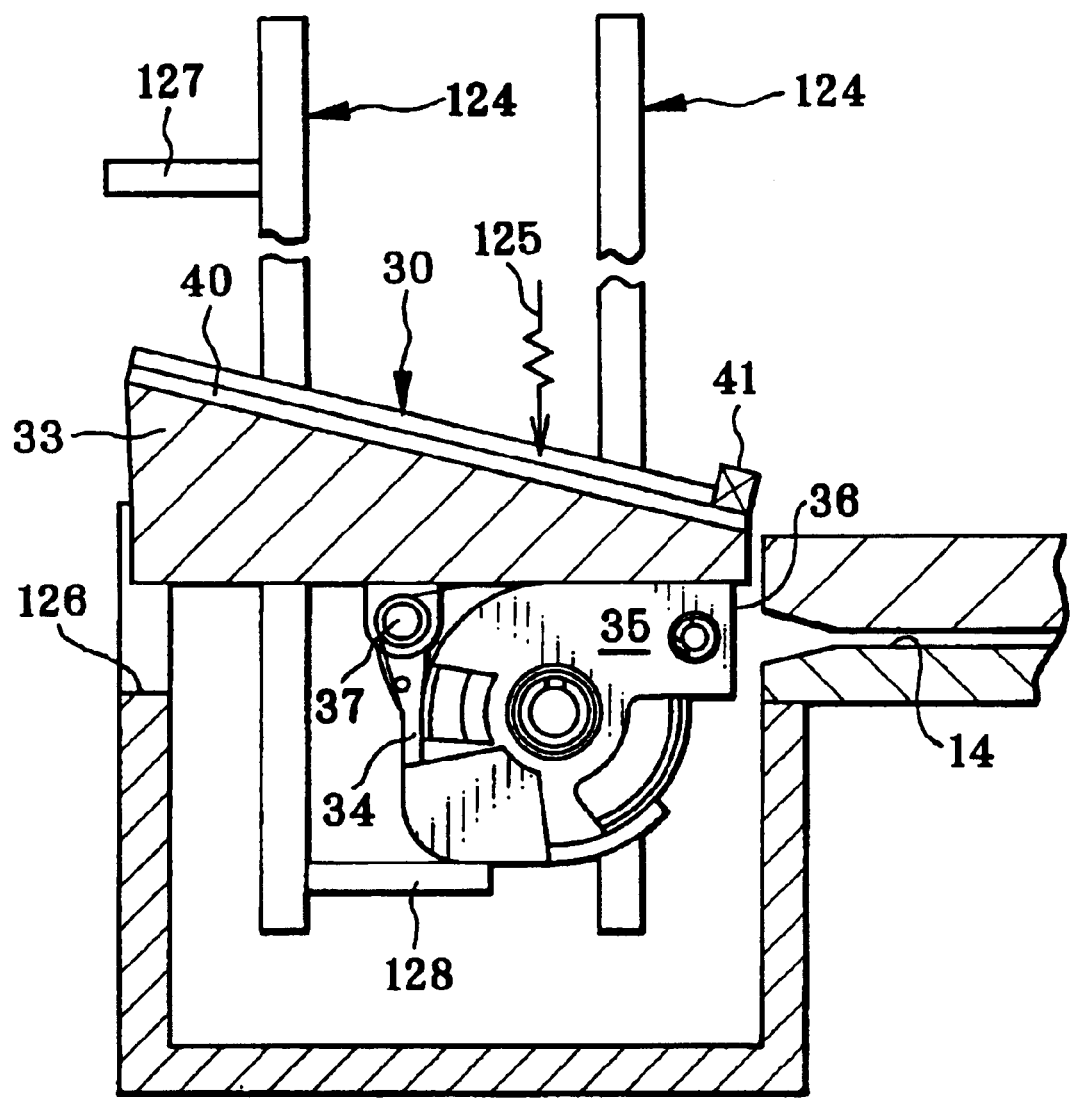
FIG. 13 is a vertical section, partially broken, illustrating the same as FIG. 11 but in a state where the guide holder is ready for removal of the photo film.

Another preferred embodiment is described by referring to FIGS. 11–13. A holder plate is vertically slidable instead of the rotational movement. The holder plate is biased by a spring or other suitable biasing elements.

States of the holder is depicted in FIGS. 11–13, including states of being set in the strip guiding position, the loading position and the photo film advancing position. Note that elements in FIGS. 11–13 similar to those of the above embodiment are designated with identical reference numerals. Straight linking rods 124 support the guide holder 30 in a vertically movable manner. A spring 125 biases the guide holder 30 in a downward direction.

The straight linking rods 124 are provided with a first stopper 128, which positions the guide holder 30 in the photo film advancing position when the retention arm 34 is in the retention position. A second stopper 126 is disposed to position the guide holder 30 in the photo film guiding position. Also, a third stopper 127 is disposed to set the guide holder 30 in the loading position.

In FIG. 11, the second stopper 126 contacts the holder plate 33 to keep the guide holder 30 in the strip guiding position against the bias of the spring 125. To load the photo film cassette 35, the guide holder 30 is manually operated and raised again the bias of the spring 125. Then the third stopper 127 comes in contact with the guide holder 30, and keeps the guide holder 30 from rising further. See FIG. 12 for the loading position. While the guide holder 30 is raised and kept in the loading position, the retention arm 34 is rotated from the closed position to the open position. The photo film cassette 35 is inserted. Thus, the retention arm 34 rotates from the closed position to the open position, and holds the photo film cassette 35.

After loading of the photo film cassette 35, rise of the guide holder 30 is stopped. The bias of the spring 125 causes the guide holder 30 to move down. In FIG. 13, the retention arm 34 is in the retention position. In the course of the drop of the guide holder 30, the retention arm 34 comes in contact with the first stopper 128 earlier than the holder plate 33 comes close to the second stopper 126. So the guide holder 30 is positioned in the photo film advancing position. Also, the retention arm 34 is in the closed position while the guide holder 30 does not have the photo film cassette 35. See FIG. 11. When the guide holder 30 moves lower than the loading position, the holder plate 33 comes in contact with the second stopper 126 earlier than the retention arm 34 comes close to the first stopper 128. The guide holder 30 becomes positioned in the strip guiding position that is lower than the photo film advancing position.

Furthermore, it is possible in the guide holder 30 to dispose a sensor for detecting existence or lack of the photo film cassette 35. According to a signal of detection at the sensor, a stopper mechanism may be moved between a position of contacting the guide holder 30 and a position away from the guide holder 30.

In the above embodiments, the guide holder 30 is either rotated or moved straight. However, the guide holder 30 may be shifted in a combined manner of rotation and straight movement. For example, the guide holder 30 may be rotated between the loading position and the photo film advancing position, and moved straight between the photo film advancing position and the strip guiding position. Furthermore, the guide holder 30 may be moved straight between the loading position and the photo film advancing position, and rotated between the photo film advancing position and the strip guiding position. The photo film to be treated in the present invention may other than the photo filmstrip, but can be continuous photo film having a great length. Also, the photo film in the strip shape can remain uncut after being drawn out of the cassette.

In the above embodiments, the photo film carrier has two feeding paths. However, a photo film carrier of the invention may have only one feeding path. In the above embodiments, the photo film is treated in the strip form removed from the cassette. However, a form of the photo film may be photo film pieces into which the photo film strip may be cut and each of which may have a certain small number of frames, for example six frames. Also, the photo film of the invention may be a type other than the IX240 type. The construction of the invention is effective in the use of photo film which, after the development, can be treated both in the cassetteless strip form and in the cassette contained form. In the above embodiment, the guide holder 30 includes the holder plate 33 and the retention arm 34 for squeezing the photo film cassette 35. However, the guide holder 30 according to the invention may be constructed according to any suitable manner. The three positions of the guide holder 30 are arranged in the order of the loading position, photo film advancing position and strip guiding position. However, three positions where the guide holder 30 is set may be arranged in the order of the loading position, strip guiding position, and photo film advancing position. The retention arm 34 and the guide recess 40 may be located opposite with reference to the holder plate 33.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film advancing device for advancing a first type of photo film toward an entrance of a feeding path, said photo film being contained in a photo film cassette, said photo film cassette having a photo film passageway, said photo film advancing device comprising:

a base member disposed to extend upstream from said entrance;

a guide holder, secured to said base member in a shiftable manner between first and second positions, and having a holder portion and a guide portion;

wherein said holder portion is loaded with said photo film cassette, and when said guide holder is in said first position, is positioned close to said entrance, such that said photo film passageway is opposed to said entrance; and said guide portion, when said guide holder is in said second position, is positioned close to said entrance, for guiding entry of photo film of said first type in a cassetteless form to said entrance.

2. A photo film advancing device as defined in claim 1, wherein said guide holder includes:

a shiftable holder plate, disposed to extend upstream from said entrance, having first and second faces, said first face constituting said holder portion, said second face being smooth and constituting said guide portion; and a retention member for retaining said photo film cassette on said first face.

3. A photo film advancing device as defined in claim 2, further comprising a first stopper for preventing said holder plate from moving beyond said first position when said holder plate is in said first position with said photo film cassette retained by said retention member.

4. A photo film advancing device as defined in claim 3, wherein said retention member, when in a cassetteless state, is in a closed position shifted near to said holder plate, and is distant from said first stopper;

further comprising a second stopper for preventing said holder plate from moving beyond said second position when said holder plate is in said second position.

5. A photo film advancing device as defined in claim 4, wherein said retention member includes a retention arm, having a shape corresponding to said photo film cassette, and secured to said holder plate movably;

further comprising a bias member for biasing said retention arm toward said holder plate to retain said photo film cassette on said holder plate.

6. A photo film advancing device as defined in claim 5, wherein said second position is located lower than said first position;

said holder plate is further shiftable to a third position that is higher than said first position with respect to said base member, said third position is adapted for loading and unloading said photo film cassette to said retention member.

7. A photo film advancing device as defined in claim 6, wherein said photo film cassette includes:

a rotatable spool for winding said photo film thereabout;

a rotatable cassette shutter for shutting said photo film passageway openably;

further comprising:

a spool drive mechanism for being engaged with an axial end portion of said spool, to rotate said spool;

a cassette shutter drive mechanism for being engaged with an axial end portion of said cassette shutter, to rotate said cassette shutter; and a control unit for actuating said spool drive mechanism and said cassette shutter drive mechanism in response to setting said holder plate in said first position, to advance said photo film from said photo film cassette, or to return said photo film into said photo film cassette.

8. A photo film advancing device as defined in claim 7, further comprising a third stopper for preventing said holder plate from moving beyond said third position when said holder plate is in said third position.

9. A photo film advancing device as defined in claim 7, further comprising a linking mechanism for securing an upstream edge portion of said holder plate to said base member in a pivotally movable manner.

10. A photo film advancing device as defined in claim 9, further comprising a projection portion, formed to project from said holder plate, for providing said holder plate with additional weight, to ensure shifting of said bolder plate toward said first or second stopper under gravity.

11. A photo film advancing device as defined in claim 7, further comprising a linking mechanism for supporting said holder plate to said base member in a slidable manner.

12. A photo film advancing device as defined in claim 11, further comprising a bias mechanism for biasing said holder plate downwards, to ensure shifting of said holder plate toward said first or second stopper.

13. A photo film advancing device as defined in claim 7, wherein a second type of photo film is further usable;

further comprising a second feeding path, disposed substantially in parallel with said feeding path, having a second entrance at an upstream end, for transporting said second type of said photo film inserted therein.

14. A photo film advancing device as defined in claim 13, wherein said first type is IX240 type, and said second type is 135 type.

15. A photo film advancing device as defined in claim 7, further comprising:

a slider operable externally for sliding;

a support frame for supporting said spool drive mechanism; and a transmission mechanism for sliding said support frame in response to sliding of said slider, to move said spool drive mechanism relative to said spool.

16. A photo film advancing device as defined in claim 15, further comprising:

a transmission lever having a driven end portion and a driving end portion, said driving end portion driving said cassette shutter drive mechanism; and a cam mechanism, connected between said slider and said driven end portion, for swinging said transmission lever in response to sliding of said slider, to actuate said cassette shutter drive mechanism.

17. A photo film advancing device as defined in claim 16, further comprising:

a first rack for sliding with said slider;

a transmission gear for being rotated by sliding of said first rack;

a second rack, secured to said support frame, for being slid by rotation of said transmission gear.

18. A photo film advancing device as defined in claim 17, further comprising:

a motor for rotating said spool drive mechanism; and a planetary gear mechanism, secured between said motor and said spool drive mechanism, for disconnecting said spool drive mechanism from said motor when said spool drive mechanism rotates at a higher speed than a reference speed.

19. A photo film advancing device as defined in claim 18, wherein said planetary gear mechanism includes:

a sun gear for being rotated by said motor;

first and second planet gears, meshed with said sun gear, for being rotated selectively; and an auxiliary gear for driving said spool drive mechanism, for being rotated by said first planet gear when said sun gear rotates in a first direction, and for being rotated by said second planet gear when said sun gear rotates in a second direction.

20. A photo film carrier, including a first feeding path, having an entrance, for feeding a first type of photo film from a photo film cassette that has a photo film passageway, a first opening, formed in said first feeding path, and adapted for external access to said photo film for frame reading or frame printing, and a winding unit for winding said photo film from said first feeding path, said photo film carrier comprising:

a base member disposed to extend upstream from said entrance;

a guide holder, secured to said base member in a shiftable manner between first and second positions, and having a holder portion and a guide portion;

wherein said holder portion is loaded with said photo film cassette, and when said guide holder is in said first position, is positioned close to said entrance, such that said photo film passageway is opposed to said entrance; and said guide portion, when said guide holder is in said second position, is positioned close to said entrance, for guiding entry of photo film of said first type in a cassetteless form to said entrance.

21. A photo film carrier as defined in claim 20, wherein said guide holder includes:

a shiftable holder plate, disposed to extend upstream from said entrance, having first and second faces, said first face constituting said holder portion, said second face being smooth and constituting said guide portion; and a retention member for retaining said photo film cassette on said first face.

22. A photo film carrier as defined in claim 21, wherein a second type of photo film is further usable; further comprising:

a second feeding path, disposed substantially in parallel with said first feeding path, having a second entrance at an upstream end, for transporting said second type of said photo film inserted therein;

a second opening, formed in said second feeding path, and adapted for external access to said second type of said photo film for frame reading or frame printing.

23. A photo film carrier as defined in claim 22, further comprising:

a carrier body, secured to a reading station of an image reading device or a printing station of a printer, and having said first and second feeding paths, said first and second openings, and said base member; and a shifting mechanism for shifting said carrier body relative to said image reading device or said printer, to set a selected one of said first and second openings at said reading or printing station.

24. A photo film carrier as defined in claim 23, wherein said first type is IX240 type, and said second type is 135 type.

25. A photo film carrier as defined in claim 23, further comprising a linking mechanism for securing an upstream edge portion of said holder plate to said base member in a pivotally movable manner.

26. A photo film carrier as defined in claim 23, further comprising a linking mechanism for supporting said holder plate to said base member in a slidable manner.

27. A photo film carrier as defined in claim 4, wherein said first stopper and said second stopper are disposed on a single plate.

* * * * *